US009897452B2

(12) United States Patent
Dale (10) Patent No.: US 9,897,452 B2
(45) Date of Patent: Feb. 20, 2018

(54) METHOD FOR ASSISTING THE MOVEMENT OF AN AGENT IN AN INTERIOR ENVIRONMENT (71) Applicant: BULL SAS, Les Clayes-Sous-Bois (FR)

(72) Inventor: Franck Dale, Saint-Martin-de-Crau (FR)

(*) Notice: Subject to any disclaimer, the term of this patent is extended or adjusted under 35 U.S.C. 154(b) by 0 days.

(21) Appl. No.: 15/128,542

(22) PCT Filed: Mar. 25, 2015

(86) PCT No.: PCT/FR2015/050756
§ 371 (c)(1),
(2) Date: Sep. 23, 2016

(87) PCT Pub. No.: WO2015/145070
PCT Pub. Date: Oct. 1, 2015

(65) Prior Publication Data
US 2017/0138741 A1 May 18, 2017

(30) Foreign Application Priority Data

Mar. 26, 2014 (FR) .................... 14 52595

(51) Int. Cl.
G01C 21/34 (2006.01)
G01C 21/20 (2006.01)
G01S 5/02 (2010.01)
G06Q 10/04 (2012.01)
G06Q 50/28 (2012.01)

(52) U.S. Cl.
CPC .......... G01C 21/206 (2013.01); G01S 5/0205 (2013.01); G06Q 10/047 (2013.01); G06Q 50/28 (2013.01)

(58) Field of Classification Search
CPC .. G01C 21/206; G01S 5/0205; G06Q 10/047; G06Q 50/28
USPC ......................................... 701/431
See application file for complete search history.

(56) References Cited

U.S. PATENT DOCUMENTS 8,320,939 B1* 11/2012 Vincent .................. G01S 19/48
370/338
2011/0081922 A1* 4/2011 Chandra ............... H04W 4/206
455/457

FOREIGN PATENT DOCUMENTS

EP 2 148 167 A2 1/2010

OTHER PUBLICATIONS

International Search Report as issued in International Patent Application No. PCT/FR2015/050756, dated Jul. 14, 2015.

* cited by examiner

Primary Examiner — Muhammad Shafi
(74) Attorney, Agent, or Firm — Pillsbury Winthrop Shaw Pittman LLP (57) ABSTRACT A method for assisting the movement of an agent in an interior environment is presented. The method allows one to calculate an itinerary on a dynamics graph. The dynamics graph is produced by those circulating in the zone to be mapped, the paths travelled being recorded by a geopositioning system compatible with inside use. The zone to be mapped is modelled in elementary volumes recoded in a zone database. The recorded paths are used to create a graph whereon an itinerary is calculated between two points, each of which being associated with an elementary volume of the zone.

14 Claims, 3 Drawing Sheets

FIG. 3

METHOD FOR ASSISTING THE MOVEMENT OF AN AGENT IN AN INTERIOR ENVIRONMENT

CROSS REFERENCE TO RELATED APPLICATIONS

This application is the U.S. National Stage of PCT/FR2015/050756, filed Mar. 25, 2015, which in turn claims priority to French Patent Application No. 1452595 filed Mar. 26, 2014, the entire contents of all applications are incorporated herein by reference in their entireties.

TECHNICAL FIELD OF THE INVENTION

The invention relates to a method to assist movement of an agent in an indoor environment. The invention also relates to a device implementing the said method, and to a medium on which instruction codes corresponding to an implementation of the said method are recorded.

In the context of the present application the term "agent" will be understood to mean any person or any device able to move within a predetermined area. A predetermined area is, for example, a goods warehouse, a data centre, and more generally any building or area where goods are stored. Variants of the system are possible in the medical field, and also in the data-mining field The field of the invention is that of assistance with movement in industrial storage or operational areas. Such areas are, for example, data centres, stores of the "drive-in" type, and goods warehouses. A "drive-in" store is a store in which a client does not enter but submits an order, including a plurality of items stored in a warehouse, and visits to collect it when it has been made up for them. These stores are also called "drive stores". The term "car service" is also used.

STATE OF THE PRIOR ART

In the state of the art the number of stores of the "drive-in" type is increasing. Users of them do not to have to pass along shelves of items to fill a trolley according to their needs. With them, these same users are not obliged to queue when paying for their purchase. Similarly, from the standpoint of a user, a warehouse of the "drive-in" type limits the number of handling operations required to obtain the items, as these items do not have to be presented to a cashier. From the user's standpoint all the handling and stocking/destocking problems become the supplier's responsibility.

From the supplier's standpoint the advantages of a store organised as a "drive-in" are substantial:
  No cost of presentation of the items
  Smaller car park area,
  Smaller tills area,
  etc.

Conversely, the supplier must meet new logistical challenges. All these challenges relate to management of the storage space and of position-finding in the corresponding area.

Currently, there is a change occurring, from standard organisation to "car service" organisation. I.e. an agent is replacing standard users, by reproducing their abilities to move within the shelving areas. The agent's experience, and therefore their length of service, and their ability to adapt to a changing environment, are key factors for their efficiency.

Problems relating to efficiency are posed with the introduction of new agents, and with changes to the topology of the storage area. These problems lead to increased times required to put together an order.

Putting an order together is the action of passing through a storage area to find in it the items in the order, which is a list of items. In the best cases this process is accomplished using a computer assistant which lists items, giving their coordinates, in the form of a row identifier and possibly a column identifier. The agent then looks in the warehouse for identifiers to find the item, and then moves on to the next one. Over time the difficulty is that these identifiers are attached to structures which can move, or attached to structural elements which, depending on the agent's position, are sometimes invisible.

This is the reason why most agents take no account of the visible indications, and rely on their experience, or lack of it, when moving within the warehouse, in a randomly efficient manner. The greatest difficulty arises when an item's storage location is changed.

Similarly, the agent has no assistance to optimise their "round" when making up an order.

This results in congestion, above all at busy times, in the delivery areas, which must be made larger to prevent vehicles parking on the access roads.

One solution would be to use a guidance solution which enables the agent to be guided when making up an order. There appears to be such a solution: GPS systems or systems based on Wi-Fi terminals come to mind, for example.

But these systems either do not work indoors (this is the case with GPS), or are unsuitable for changing environments. This last limitation is inherent to all existing systems: they presuppose the existence of a map on which the calculation of a route is based, and this map is static. If an obstacle moves or appears the system must be updated, just as GPS systems are updated to take account of new road routes and new road signalling.

No existing system is therefore suitable for the cases in question.

DESCRIPTION OF THE INVENTION

The invention seeks to remedy all or a proportion of the disadvantages of the state of the art identified above, and in particular to propose means to determine a route in an indoor environment with a changing topology.

To this end, one aspect of the invention relates to a method for assisting the movement of an agent between a first point and a second point in a predetermined area (100), where the first point and the second point are located by coordinates relating to the predetermined area, where the method of assistance includes a step of calculation of a route between the first point and the second point, where the route calculation is made from a graph recorded in means for storing a graph server, where the route is displayed on an assistance device containing geolocation means producing coordinates relative to the predetermined area, and where the method is characterised in that it includes the following characteristics:
  A step prior to the calculation of a route including the following steps:
    Modelling of the predetermined area in terms of elementary volumes, and recording of these elementary volumes in an area database,
  A step, which is continuously performed, by the assistance device, comprising the following steps:
    Determination of the position of the assistance device,
    Production and transmission of a position message, including at least the determined position, to the graph server A step, which is continuously performed, by the graph server, including the following steps:
Reception of a position message
Updating of the graph on the basis of the position message, where the update involves associating the position message with an elementary volume in the area database
A step of calculation of a route such that:
The graph to be used to calculate routes is extracted from the model, and is such that there is a peak of the graph for each elementary volume, and where two peaks are connected by an arc if their corresponding elementary volumes are adjacent, and if their elementary volumes are associated with at least one position message.
To calculate the route the first point is associated with a first elementary volume, and the second point is associated (1420) with a second elementary volume, the route calculation being made between the peaks associated with the first elementary volume and with the second elementary volume In addition to the main characteristics mentioned in the preceding paragraph, the method according to the invention may have one or more of the following possible additional characteristics, considered individually or in technically possible combinations:
the elementary volume is a cube.
the edge of the cube is between 40 and 60 cm in length.
when calculating a route on a first date, since the position messages are dated, only those position messages the age of which, compared to the first date, is less than a first predetermined age threshold are considered.
if a route cannot be determined a new calculation is made, considering only position messages the age of which, compared to the first date, is less than a second predetermined age threshold, where the second age threshold is higher than the first age threshold.
a calculated route is recalculated during the path taken, to adapt to the topographical variations of the predetermined area,
coordinates are an identifier of an elementary volume, each elementary volume of the predetermined area being associated with a unique identifier The invention also relates to a digital storage device containing a file containing instruction codes implementing the method according to a combination of the preceding characteristics.

The invention also relates to a device implementing the method according to a combination of the preceding characteristics The invention also relates to the use of the movement frequency in an elementary cube to define the possibility of using this cube as a path in connection with a route calculation.

The invention defines several passage areas in terms of the obsolescence parameters and passage frequency parameters. Possible passage, probable passage and impossible passage areas can be observed.

BRIEF DESCRIPTION OF THE FIGURES

Other characteristics and advantages of the invention will be seen clearly on reading the description below, with reference to the appended figures, which illustrate.

DETAILED DESCRIPTION OF ONE IMPLEMENTATION

When an action is imparted to a device it is in fact performed by a microprocessor of the device controlled by instruction codes recorded in a memory of the device. If an action is imparted to an application it is in fact performed by a microprocessor of the device in a memory where the instruction codes for the application are recorded.

The devices to which actions are imparted include computers and servers. This is a device which is functionally identical, but which has different physical characteristics, for example in terms of component malfunction tolerance. In this description one or other of the terms is used for the sake of clarity. In practice, if installed with an identical application, a computer and a server are functionally equivalent and therefore interchangeable.

When the term "continuously performed action" is used, this means that the action is performed independently of any human intervention. This relates, for example, to a planned task, a computer service or computer daemon reacting to an event. An event is, for example, the reception of a message over a network. In a "continuous" context the terms "on-the-fly" or "machine to machine" process are also used.

Figure 1:
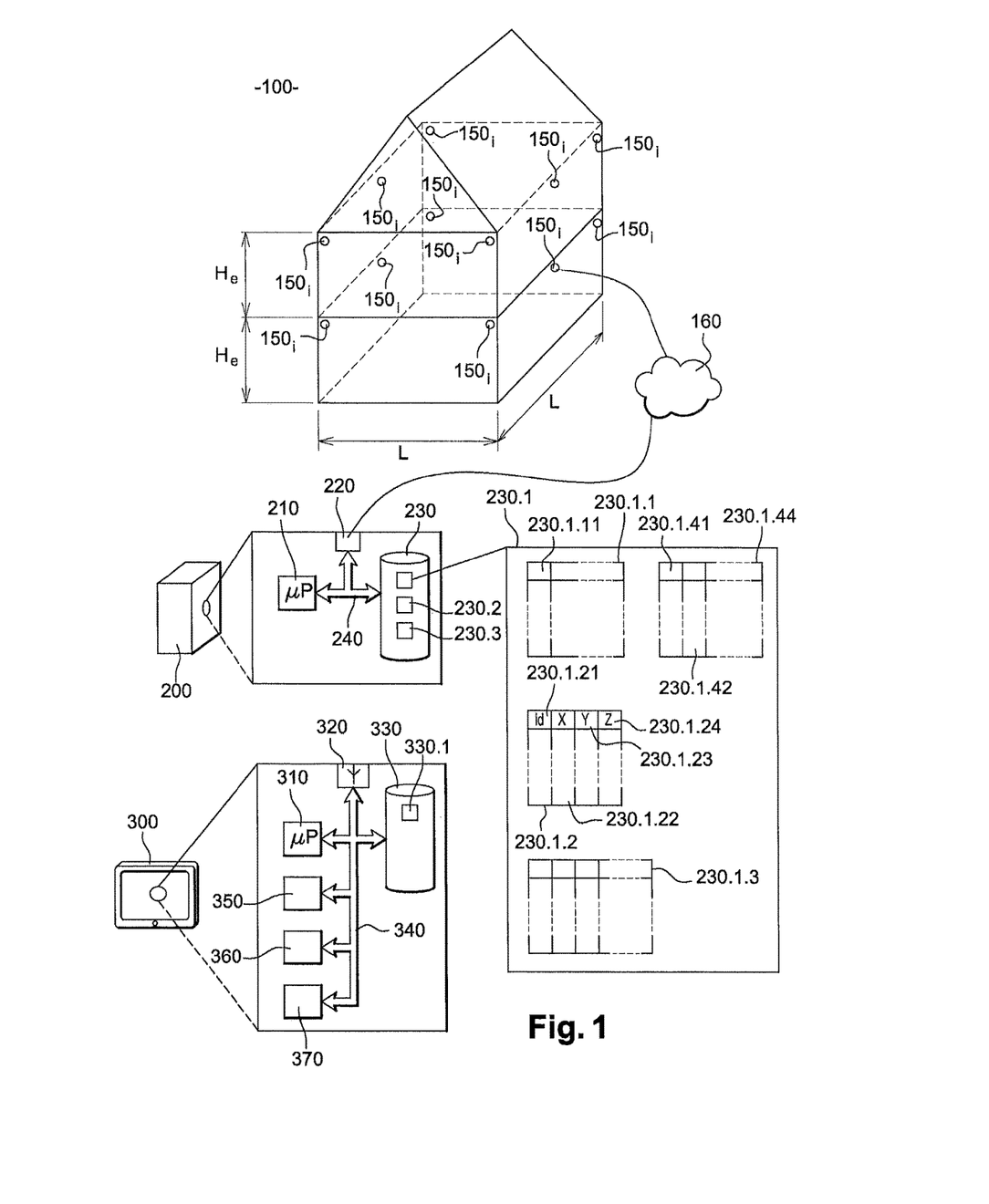
FIG. 1, an illustration of a device enabling implementation of the method according to one embodiment of the invention.

FIG. 1 shows a predetermined area 100, for example a warehouse 100, equipped with a geolocation system. Warehouse 100 is, for example, a building with a square base, where one side of the square L is 100 meters in length, and NBe, which is equal to 2, floors of a height He of 5 meters each.

In our example modelling of this volume by filling by a cubic elementary volume is considered, where such an elementary cube then has, for example, an edge Cp of 0.5 meter.

In this example, warehouse 100 is therefore modelled by:

$$(NBe*He*L*L)/Cp^3 = 800{,}000 \text{ in our example.}$$

FIG. 1 also shows a graph server 200 including:
A microprocessor 210,
A communication interface 220, for example an Ethernet card or a Wi-Fi card,
Storage means 230.
Microprocessor 210 of graph server 200, communication interface 220 of graph server 200 and storage means 230 of graph server 200 are interconnected by a bus 240. The storage means are local, i.e. directly connected to bus 240, or remote, i.e. connected via the communication interface.

FIG. 1 shows that storage means 230 of graph server 200 contain an area database area 230.1, enabling the model of predetermined area 100 to be recorded. In our example a relational database is considered to describe possible data structures which can be used to implement the invention. Other database types can be used, including, non-restrictively, databases known as "NoSQL" databases.

The area database contains a table 230.1.1 of elementary volumes; each line of the table corresponds to an elementary volume, in this case a cube. Each line of the table contains at least one column 230.1.11 with a unique identifier of the elementary volume, together with other columns containing characteristics of the elementary volume. In what follows it will be illustrated that a line of table 230.1.1 of elementary volumes, i.e. an elementary volume, can be associated with other lines in other tables.

In a variant, volumes table 230.1.1 contains eight additional columns, where each column corresponds to the coordinates of peaks of the cube in an orthonormal coordinate system relating to predetermined area 100. In this case, volumes table 230.1.1 enables a conversion to be made from an elementary volume identifier to coordinates, and vice versa. Other variants also allow this.

In another variant, table 230.1.1 of elementary volumes contains 2 additional columns, a first column to store the coordinates of a peak of the cube in an orthonormal coordinate system relating to predetermined area 100, and a second column to store the length of the edge of the cube. In a sub-variant, if all the edges of all the cubes have the same known length, this second column is optional.

In yet another variant, table 230.1.1 of elementary volumes contains no columns relating to the geometry of the volume, and this data is deduced from the identifier of the cube, where this identifier is attributed in a predetermined order allowing the coordinates of its peaks to be calculated, through the use of modulos.

Figure 2:
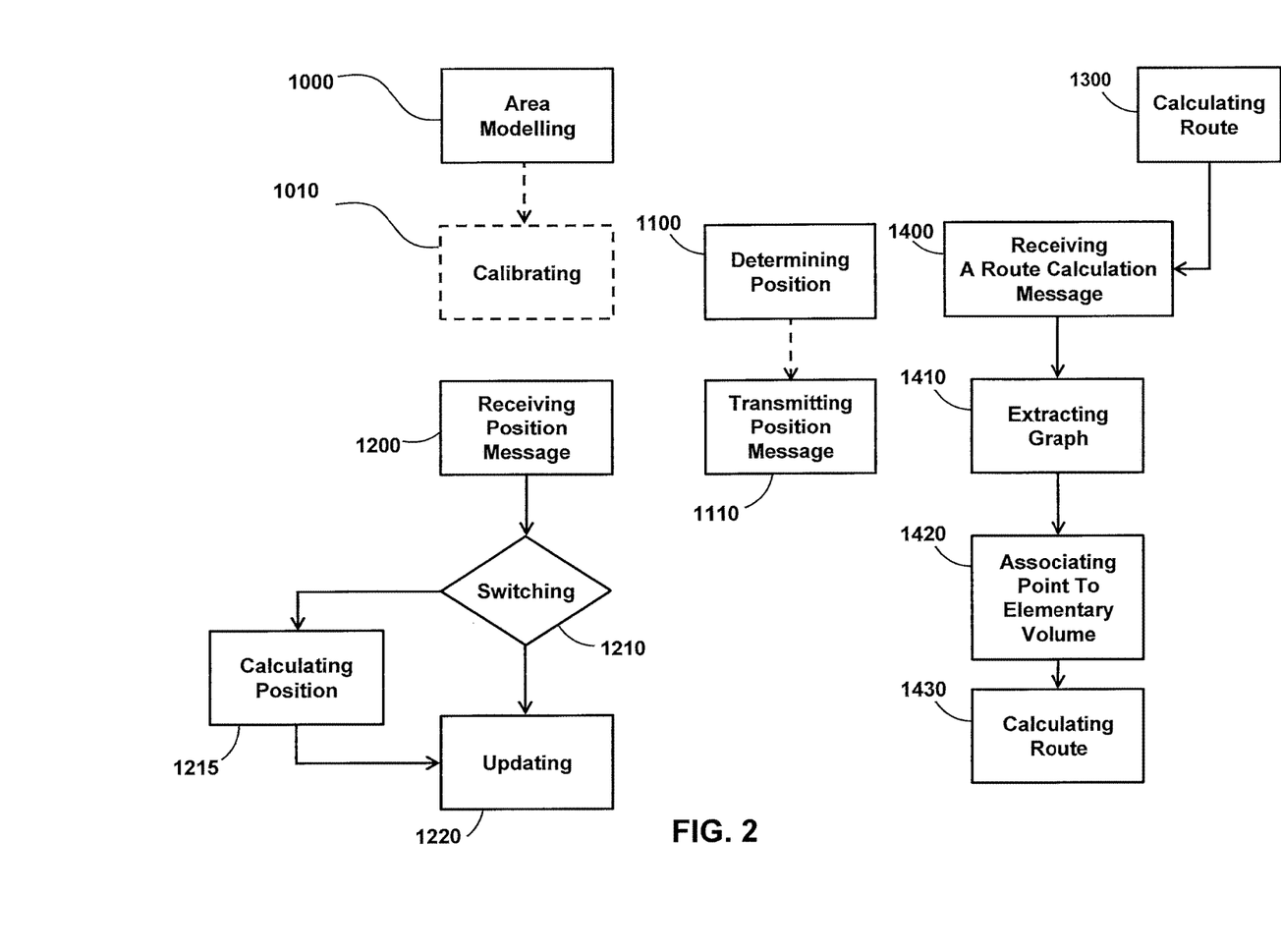
FIG. 2, an illustration of a step of the method according to the invention.

FIG. 2 shows a step 1000 in which table 230.1.1 of elementary volumes of the graph server's area database is initialised. This initialisation is accomplished, for example, by three nested loops, each loop corresponding to one dimension of the predetermined area.

FIG. 1 also shows that predetermined area 100 is pre-equipped with a plurality of radio devices 1501, for example Wi-Fi terminals, positioned, for example, in the upper corners of the floors, and also in the middle of the upper edges of the floors. This is an arbitrary arrangement. Associated with this arrangement, FIG. 1 shows that the area database contains a table 230.1.2 of radio devices containing a list of the plurality of radio devices. A line in table 230.1.2 corresponds to each radio device of the plurality of radio devices, where each line contains at least:

A radio device identifier 230.1.21, for example an SSID,
A set of coordinates X 230.1.22, Y 230.1.23, Z 230.1.24 in an orthonormal coordinate system relating to the predetermined area.

In this description it is obvious that only an orthonormal coordinate system relating to the predetermined area is being considered, in order to guarantee the uniformity of the Cartesian coordinates used.

In variants, there may be more radio devices may, and these may be distributed more irregularly, depending on the devices or walls present in the predetermined area.

FIG. 1 also shows that graph server 200 is connected, via its communication interface, to a network 160, represented, for example, by a switch, where at least one of the radio devices of the plurality of radio devices is also connected to said network 160. If the radio devices are connected by radio, this means that the radio devices can communicate with the graph server, it also means that any mobile device connected to one radio device of the plurality of radio devices can communicate with the graph server.

FIG. 1 shows a mobile device 300 when can be used by an agent moving in the predetermined area. Mobile device 300 includes A microprocessor 310,
A communication interface 320, a Wi-Fi card,
Storage means 330,
Inertial means 350, for example an accelerometer
A height finder 360,
A compass 370,
etc.

Microprocessor 310 of mobile device 300, communication interface 320 of mobile device 300 and storage means 330 of mobile device 300, inertial means 350 of mobile device 300, height finder 360 of mobile device 300 and compass 370 of mobile device 300 are interconnected by a bus 340.

Via its communication interface mobile device 300 can:
Connect to any radio device of the plurality of radio devices, and therefore communicate with the graph server,
Measure the received power levels of all the radio devices within range.

Mobile device 300 is also connected to, or includes, video acquisition and playback means. These means are, for example, a screen and a camera of mobile device 300 or, in another example, augmented reality glasses connected to mobile device 300. The assembly consisting of mobile device 300 and the video acquisition and playback means form an assistance system.

FIG. 1 shows that storage means 330 of mobile device 300 include a graph server address area 330.1. This is a configuration parameter enabling mobile device 300 to communicate with the graph server. In a variant of the invention in which the mobile device obtains a network address dynamically, this address parameter is obtained at the same time as the dynamic address, or it is decided that this parameter is equal to the address of the server serving the dynamic address. In this case the graph server also acts as the DHCP server.

FIG. 2 shows a step 1100 of determining the position of mobile device 300. The prior step to this determination is the measurement of the power levels received by the radio devices, from the plurality of radio devices, within range of the mobile device, in particular of the power levels of the transmissions corresponding to the Wi-Fi standard. Each power level is associated with a radio device identifier. This is in fact a scan of the available Wi-Fi networks. This scan is performed continuously.

After this there are two possibilities: either mobile device 300 makes the calculations itself, or it transmits its measurements for another device to make the calculations in its place, and to return the coordinates to it in reply. The coordinates are the result of the calculations.

In the first case the mobile device must have a copy of table 230.1.2 of radio devices. After this, depending on the power levels received, it is able to determine at what distance from each radio device of the plurality of radio devices it is located. The distance is a function of the power level received, when the transmitted power is known. This transmitted power is either transmitted by the radio device, or recorded in an additional column of table 230.1.2 of radio devices.

When the distances are known all that is required is to calculate the intersection of the spheres centred on the radio devices. The result gives the coordinates of mobile device 300 when it made the power measurements. These calculations are known as triangulation calculations.

When the coordinates have been calculated, mobile device 300 changes to a step 1110 of production and transmission of a position message. A position message includes at least, apart from the fields specific to the communication protocol:

A predetermined code enabling the nature of the message to be determined;

A calculation date;

The calculated coordinates.

When it has been produced the message is transmitted to the graph server, the address of which is known via the graph server address area of the storage means of mobile device 300.

In a second case the power measurements are transmitted, for example to the graph server. It should be noted that any device having a copy of table 230.1.2 of radio devices is able to make the calculations.

In this second case the power levels are preferably transmitted accompanied by a measurement date.

The device which receives these measurements makes the triangulation calculations, produces a position message containing the results of the calculation, and sends the position message to mobile device 300.

In a variant by request of the invention, step 1000 of modelling is followed by a step 1010 of calibration. In the calibration step the power levels which should be received for each radio device from the plurality of radio devices are associated with each elementary volume, via a table 230.1.3 of expected power levels. A calibration mode is as follows, in FIG. 3.

Table 230.1.3 contains:

A column 230.1.31 with an elementary volume identifier,

A column 230.1.32 with a radio device identifier,

A column 230.1.33 with the received power level.

The value of column 230.1.33 may be set by making measurements, which may be burdensome, or by calculations, as described in an example which follows.

Figure 3:
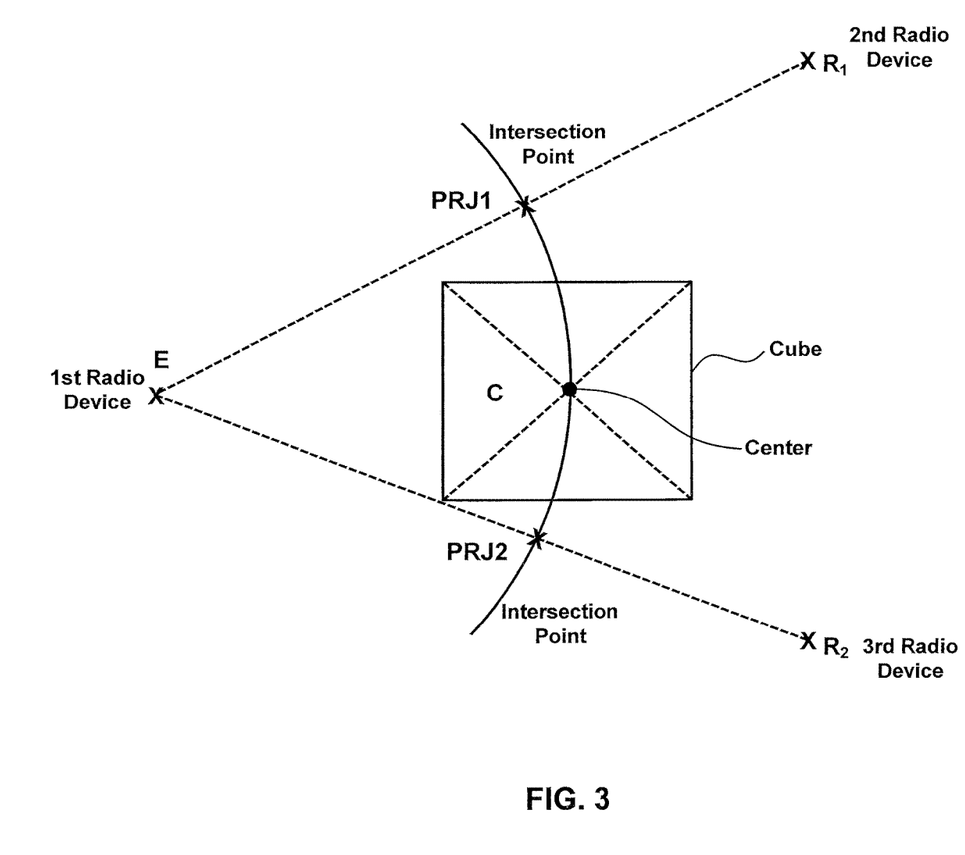
FIG. 3, an illustration of a geolocation variant which can be used by the method according to the invention.
For greater clarity, identical or similar elements are identified by identical reference signs in all the figures.
The invention will be better understood on reading the description which follows, and on examining the figures accompanying it. These are shown as an indication only, and are not restrictive of the invention in any manner.

FIG. 3 shows, as a projection in a horizontal plane, a cube, geometric centre C of which is considered. We refer to cube C.

FIG. 3 also shows three radio devices, a first radio device E, a second radio device R1, and a third radio device R2.

If the coordinates of cube C and of the first, second and third radio devices are known, it is possible to calculate:

dec=distance between first radio device E and cube C;

der1=distance between first radio device E and second radio device R1;

der2=distance between first radio device E and third radio device R2;

Second radio device R1 measures 11, the power level at which it receives from radio device E. Third radio device R2 measures 12, the power level at which it receives from radio device E.

After this it is possible to calculate power levels projected radially, i.e.:

a power level Iprjl received at point Prj1 of intersection of a sphere of radius dec and of centre C and of a straight line passing through the first and second radio devices.

$Iprj1 = dec*I1/der1$ a power level Iprj2 received at point Prj2 of intersection of a sphere of radius dec and of centre C and of a straight line passing through the first and third radio devices.

$Iprj2 = dec*I2/der2$

By geometric considerations it is also possible to calculate the following distances $dp1c$=distance between $Prj1$ and $C=((Prj1.x-C.x)^2+(Prj1.y-C.y)^2+(Prj1.z-C.z)^2)^{(1/2)}$ $dp2c$=distance between $Prj2$ and $C=((Prj2.x-C.x)^2+(Prj2.y-C.y)^2+(Prj2.z-C.z)^2)^{(1/2)}$ $dp1p2$=distance between $Prj1$ and $Prj2=((Prj2.x-Prj1.x)^2+(Prj2.y-Prj1.y)^2+(Prj2.z-Prj1.z)^2)^{(1/2)}$ Then power level Ice received at C from the first radio device is given by the formula:

$$Ice = \frac{dp1p2 - dp1c}{dp1p2} * Iprj1 + \frac{dp1p2 - dp2c}{dp1p2} * Iprj2$$

By this method each cube can be associated with a received power level calibrated for each radio device of the plurality of radio devices.

The calibration can be restarted regularly to respond to modifications of the propagation conditions in the predetermined area. In most cases these propagation condition modifications result from a modification of the topography of the predetermined area. For example, shelves have been added or moved.

In the variant by request the geolocation of step 1100 of determining a position is made by transmitting a measurement message including measured power levels associated with radio devices. This message is transmitted to the area server. The area server then executes a query in area database 230.1, and in particular in table 230.1.3 of expected power levels, to find in it the cube identifier corresponding to the measured power levels. The area server then sends back a message corresponding to the position of the mobile device which made the power level measurements.

A measurement message includes at least, apart from the fields relating to the communication protocol, the following fields:

A code field identifying the message as a measurements message,

A date on which the measurements were made

A list of measurements, where each measurement includes:

A identifier of a radio device of the plurality of radio devices,

A measured power value.

From the standpoint of the area server, a measurement message is equivalent to a position message if both messages indicate the presence of a mobile device at coordinates in the predetermined area.

Whichever variant is used, steps 1100 of determining the position and 1110 of production and transmission of a position message are performed continuously by mobile device 300 in the predetermined area. It is understood that, depending on the variant, step 1110 may be optional, in particular in variants in which the mobile device merely makes the power measurements.

These steps are, for example, undertaken at a predetermined frequency. This frequency may change over time depending on inertial measurements: the frequency increases if the motion accelerates, and reduces in the contrary case. This frequency can also be related to an estimated average speed of motion. For example, for an average speed of 1 m/s, this frequency could be at least 4 Hz, to guarantee at least one measurement per elementary volume in the chosen example.

FIG. 2 shows a step 1200 continuously performed by area server 200. This step is a step of listening to the network in order to detect position messages or equivalent messages, such as measurement messages. If such a message has been detected there is a change to a step 1210 of switching according to the nature of the message. If the message is a position message there is a change to a step 1220 of updating of the graph; otherwise there is a change to a step 1215 of calculating a position, i.e. a geolocation according to a list of measured power levels. From step 1215 there is a change to step 1220 of updating the graph.

Step 1215 of geolocation has previously been described; this is the case in which only the measurements are made by mobile devices 300, with the calculations being performed by area server 200.

In step 1220 area server 200 has received a message which enables it to obtain a date, and a geolocation in the predetermined area.

On the basis of the geolocation, server 200 interrogates the table of elementary volumes in the area database to obtain an elementary volume identifier.

When the elementary volume identifier has been obtained, area server 200 inserts a line in tracing table 230.1.4.

Tracing table 230.1.4 contains at least:
A column 230.1.41 with an elementary volume identifier
A date column 230.1.42.

In the new line of the tracing table server 200 writes:
the elementary volume identifier obtained from the elementary volume identifier column,
the date of the message, date of geolocation or date of measurements, in the date column.

The new line obtained in this manner indicates that there has been a change on a given date in a given elementary volume. The tracing table enables movements to be monitored and a trace of possible changes to be kept. In this case a line is equivalent to a position message. It is therefore this tracing table which contains the topology of the predetermined area, and which monitors it in real time, if agents with a mobile device according to the invention move there.

FIG. 2 shows a step 1300 in which a user of mobile device 300 requests a route between two coordinates in the predetermined area.

Such a request causes a message to be produced requesting that a route is calculated. A message requesting that a route is calculated includes at least, in addition to the fields required by the routing protocol, the following fields:
A code field identifying the message as a route calculation request,
A route start field; this consists either of Cartesian coordinates, or of an elementary volume identifier,
A route end field; this consists of Cartesian coordinates In one variant the message requesting that a route is calculated includes an assignment field which contains a mobile device identifier. This variant enables a third party to send a route to a mobile device, since after the route has been calculated it will be sent to the mobile device identified by the assignment field.

The value of the route start field takes, for example, the value of the current position of mobile device 300.

The value of the route end field is, for example, obtained using an item reference which is transformed into coordinates via a query sent to an item database which will have been previously initialised to associate coordinates with each item reference in the predetermined area.

In one variant, the calculation request message includes at least one intermediate step field containing coordinates from an intermediate step.

When it has been produced the message is sent to a route calculation device. In our example this is graph server 200. In practice it may be any device having a suitable graph.

After the route request message has been produced it is sent to area server 200.

In a step 1400 of reception of a route calculation message, if the message is identified as such, it then changes to a step 1410 of extraction of a graph.

In step 1410 areas server 200 uses a first age configuration with a predetermined value, for example 2 days. This first age parameter is recorded in an area 230.2 of the storage means of area server 200.

Using this first age parameter, server 200 filters the lines of tracing table 230.1.4, keeping only those lines where the age is less than the first age parameter. The age of a line is the difference between the current date and the date stored in the line. By this means a first list of lines is obtained.

A first graph is then such that there is a peak of the first graph for each elementary volume, and where two peaks are connected by an arc if their corresponding elementary volumes are adjacent, and if their elementary volumes are associated with at least one line in the first list.

In a variant of the invention, the value of the first age parameter is equal to infinity, meaning that all traces or lines in the tracing table are considered.

In a step 1420 following step 1400, area server 200 converts, if required, the coordinates contained in the route calculation message into an elementary volume identifier, i.e. Into a peak identifier of the first graph. By this means a list of step peaks is obtained.

In a step 1430 of calculating a route following the steps of extraction from the first graph, and of conversion of the coordinates, area server 200 has knowledge of a graph and a list of step peaks of this graph. Area server 200 can therefore calculate a route, i.e. a sequence of adjacent peaks of the graph containing the list of step peaks by using, for example, a Dijkstra's algorithm, which is the most efficient graph processing algorithm on the date on which this description is written.

If no route is found then the calculation is recommenced from a second graph extracted by filtering the lines of tracing table 230.1.4 so as to keep only those the age of which is less than a second age parameter. This second age parameter is recorded in a second age parameter area 230.3 of the storage means of area server 200. By this means a second list of lines is obtained. The value of the second age parameter is strictly greater than the value of the first age parameter.

In the case of the first calculation, if it is successful, a more reliable route is obtained as it is based on more recent data.

When calculated, the route is sent to the device which made the request, or to the device designated in the route calculation message, using the assignment field.

In an unrepresented step, the route is displayed on mobile device 300 via the video playback means.

The user of device 300 can then follow the route and their progress on the video playback means.

In one variant of the invention, when the user follows a calculated route, mobile device 300 transmits, at regular intervals, route calculation requests the origin/start of which is the current position of mobile device 300, and the arrival/end of which is the arrival point of the route currently being taken. In reply, the mobile device receives a route which may be different from the route currently being taken. In this case it is the new route which is then followed.

This variant enables the invention to adapt in real time to modifications of topology of the predetermined area.

In the invention the exchanged coordinates are either Cartesian coordinates or elementary volume identifiers, where the elementary volume table allows switching from one to the other.

In one variant of the invention the area database also includes a table allowing, for each radio device of the plurality of radio devices, storage of the power level which it should receive from all the other radio devices, and also the power level which it actually receives. The power level which it should receive is a calibration value determined on a given date for a duration of the order of one week or one month. The power level actually received is a value which is refreshed over a short period, of the order of one minute or one hour. In this variant it is therefore possible to take into account modifications of the wave propagation conditions in the predetermined area.

This knowledge, in particular when the actual power level is different from the expected power level, enables the influences of the radio devices concerned in the geolocation steps to be weighted. In particular, this knowledge enables power level measurements to be corrected in a linear manner, according to a coefficient equal to the ratio of the actual power to the expected power.

A reformulation of the invention is therefore that it enables a route to be calculated for a dynamic graph. The graph is dynamic since it is extracted from the tracing table which changes according to the movements of the agents in the predetermined area. Each agent therefore participates in producing the map of the predetermined area.

The invention claimed is:

1. A method for assisting the movement of an agent between a first point and a second point in a predetermined area that includes a plurality of radio devices, where the first point and the second point are located by coordinates relating to the predetermined area, the method comprising:
   calculating a route between the first point and the second point, where the route calculation is made from a graph recorded in a storage device of a graph server, the graph server including a microprocessor and a first communication interface, the graph server configured to be in communication with at least one of the plurality of radio devices via said first communication interface,
   displaying the route on a mobile assistance device including a second communication interface and a geolocation device producing coordinates relative to the predetermined area, the mobile assistance device configured to communicate with the graph server via said second communication interface and one or more of the plurality of radio devices, wherein the method includes:
      a step prior to the calculation of a route including the following steps:
         modelling, with the microprocessor of the graph server, the predetermined area in terms of elementary volumes, and recording the elementary volumes in an area database of the storage device,
      a step, which is continuously performed, by the mobile assistance device, comprising the following steps:
         determining the position of the mobile assistance device using one or more of the plurality of radio devices, and
         producing and transmitting a position message, including at least the determined position, to the graph server,
      a step, which is continuously performed, by the graph server, including the following steps:
         receiving the position message, and
         updating the graph on the basis of the position message, where the update involves associating the position message with an elementary volume in the area database,
      a step of calculating a route by the graph server such that:
         a graph to be used to calculate routes is extracted from the model, and is such that there is a peak of the graph for each elementary volume, and where two peaks are connected by an arc if their corresponding elementary volumes are adjacent, and if their elementary volumes are associated with at least one position message, and
         to calculate the route, the first point is associated with a first elementary volume, and the second point is associated with a second elementary volume, the route calculation being made between the peaks associated with the first elementary volume and with the second elementary volume, and
      a step of transmitting the calculated route from the graph server to the mobile assistance device for displaying said calculated route on the mobile assistance device.

2. The method to assist movement according to claim 1, wherein the elementary volume is a cube.

3. The method to assist movement according to claim 2, wherein the edge of the cube is between 40 and 60 cm in length.

4. The method to assist movement according to claim 1, wherein when calculating a route on a first date, since the position messages are dated, only those position messages the age of which, compared to the first date, is less than a first predetermined age threshold are considered.

5. The method to assist movement according to claim 4, wherein if a route cannot be determined a new calculation is made, considering only position messages the age of which, compared to the first date, is less than a second predetermined age threshold, where the second age threshold is higher than the first age threshold.

6. The method to assist movement according to claim 1, wherein a calculated route is recalculated during the path taken, to adapt to the topographical variations of the predetermined area.

7. The method according to claim 1, wherein the coordinates are an identifier of an elementary volume, each elementary volume of the predetermined area being associated with a unique identifier.

8. The method to assist movement according to claim 1, wherein the radio devices are Wi-Fi terminals.

9. The method to assist movement according to claim 1, wherein the modelling includes filling a volume defined by said predetermined area with a plurality of the elementary volumes.

10. The method to assist movement according to claim 9, wherein the elementary volumes have a cubic shape.

11. The method to assist movement according to claim 1, wherein the predetermined area is an indoor environment.

12. The method to assist movement according to claim 11, wherein the indoor environment is a warehouse or a data center.

13. A non-transitory digital storage device containing a file containing instruction codes implementing a method for assisting the movement of an agent between a first point and a second point in a predetermined area that includes a plurality of radio devices, where the first point and the second point are located by coordinates relating to the predetermined area, the method comprising:
   calculating a route between the first point and the second point, where the route calculation is made from a graph recorded in a storage device of a graph server, the graph server including a microprocessor and a first communication interface, the graph server configured to be in communication with at least one of the plurality of radio devices via said first communication interface, displaying the route on a mobile assistance device including a second communication interface and a geolocation device producing coordinates relative to the predetermined area, the mobile assistance device configured to communicate with the graph server via said second communication interface and one or more of the plurality of radio devices, wherein the method includes:

a step prior to the calculation of a route including the following steps:
  modelling, by the graph server, the predetermined area in terms of elementary volumes, and recording the elementary volumes in an area database of the storage device,
a step, which is continuously performed, by the mobile assistance device, comprising the following steps:
  determining the position of the mobile assistance device using one or more of the plurality of radio devices, and
  producing and transmitting a position message, including at least the determined position, to the graph server,
a step, which is continuously performed, by the graph server, including the following steps:
  receiving the position message, and
  updating the graph on the basis of the position message, where the update involves associating the position message with an elementary volume in the area database,
a step of calculating a route by the graph server such that:
  a graph to be used to calculate routes is extracted from the model, and is such that there is a peak of the graph for each elementary volume, and where two peaks are connected by an arc if their corresponding elementary volumes are adjacent, and if their elementary volumes are associated with at least one position message, and
  to calculate the route, the first point is associated with a first elementary volume, and the second point is associated with a second elementary volume, the route calculation being made between the peaks associated with the first elementary volume and with the second elementary volume, and
a step of transmitting the calculated route from the graph server to the mobile assistance device for displaying said calculated route on the mobile assistance device.

14. A non-transitory device implementing a method for assisting the movement of an agent between a first point and a second point in a predetermined area that includes a plurality of radio devices, where the first point and the second point are located by coordinates relating to the predetermined area, the method comprising:

calculating a route between the first point and the second point, where the route calculation is made from a graph recorded in a storage device of a graph server, the graph server including a microprocessor and a first communication interface, the graph server configured to be in communication with at least one of the plurality of radio devices via said first communication interface, displaying the route on a mobile assistance device including a second communication interface and a geolocation device producing coordinates relative to the predetermined area, the mobile assistance device configured to communicate with the graph server via said second communication interface and one or more of the plurality of radio devices, wherein the method includes:

a step prior to the calculation of a route including the following steps:
  modelling, by the graph server, the predetermined area in terms of elementary volumes, and recording the elementary volumes in an area database of the storage device,
a step, which is continuously performed, by the mobile assistance device, comprising the following steps:
  determining the position of the mobile assistance device using one or more of the plurality of radio devices, and
  producing and transmitting a position message, including at least the determined position, to the graph server,
a step, which is continuously performed, by the graph server, including the following steps:
  receiving the position message, and
  updating the graph on the basis of the position message, where the update involves associating the position message with an elementary volume in the area database,
a step of calculating a route by the graph server such that:
  a graph to be used to calculate routes is extracted from the model, and is such that there is a peak of the graph for each elementary volume, and where two peaks are connected by an arc if their corresponding elementary volumes are adjacent, and if their elementary volumes are associated with at least one position message, and
  to calculate the route, the first point is associated with a first elementary volume, and the second point is associated with a second elementary volume, the route calculation being made between the peaks associated with the first elementary volume and with the second elementary volume, and
a step of transmitting the calculated route from the graph server to the mobile assistance device for displaying said calculated route on the mobile assistance device.

* * * * *